United States Patent [19]

Brookfield

[11] Patent Number: 4,978,984

[45] Date of Patent: Dec. 18, 1990

[54] SURVEILLANCE APPARATUS

[76] Inventor: Richard A. Brookfield, 9625 Merrimoor, Largo, Fla. 33543

[21] Appl. No.: 393,266

[22] Filed: Aug. 15, 1989

[51] Int. Cl.$^5$ ............................................. G03B 29/00
[52] U.S. Cl. ..................................... 354/81; 352/242; 358/108
[58] Field of Search ................. 354/81, 293; 352/242, 352/243; 358/108, 229

[56] References Cited

U.S. PATENT DOCUMENTS

| | | | |
|---|---|---|---|
| 4,160,999 | 7/1979 | Claggett | 352/242 X |
| 4,514,068 | 4/1985 | Urquhart | 354/293 |
| 4,728,839 | 3/1988 | Coughlan et al. | 310/112 |
| 4,750,832 | 6/1988 | Lloyd et al. | 352/243 |

*Primary Examiner*—A. A. Mathews

[57] ABSTRACT

A surveillance apparatus for installation in such an open ended housing as the air vent structure of a motor vehicle has first and second supports, the first support carries the cover for the housing and is movable between a position in which the outer exposed end of the housing is closed into raised positions. The second support is within the first support and is movable relative thereto and carries a surveillance unit which includes a camera and lens assembly within the housing with the center line of the lens when the cover is closed in the plane of the outer end of the housing. Both supports are shown in the disclosed embodiment, as driven by a reversible drive in a manner such that the second support at all times travels one-half the distance which the first support travels. Desirably and as shown, the surveillance unit includes a pan and tilt assembly on which the camera and lens assembly is mounted. The motors of the surveillance unit and the motor of the reversible drive are remotely controlled.

14 Claims, 3 Drawing Sheets

SURVEILLANCE APPARATUS

BACKGROUND OF THE INVENTION

In the general area of surveillance for law enforcement agencies many devices are available for viewing and listening remotely. It is standard practice to conceal the viewing and listening devices in mobile equipment such as recreational vehicles, vans, or other similar innocuous appearing vehicles to attract little suspicion as to their presence. Miniature optical systems using fiber optics can provide viewing with excellent concealment. However, to obtain maximum definition and clarity, zoom lens systems with telephoto capability still require a device not easily concealed. The most commonly used viewing methods are through a hopefully disguised periscope mounted on the roof of the vehicle offering the ability to observe and record the scene through a full 360°.

There is, however, a varied set of problems with the standard periscope, which has the camera inside the vehicle looking at the lower mirror of the periscope, which in turn reflects the image from the upper mirror of the periscope. Thus, there is the loss of intensity and definition created by the doublw reflection. An additional difficulty if the projection of this periscope and camera into the limited overhead space in the vehicle, especially the most commonly used van type vehicle. The major problem occurs with the necessity for full or nearly full raising of the periscope to achieve a view of the area under surveillance whether near or at a distance.

THE PRESENT INVENTION

The general objective of the present invention is to provide surveillance apparatus the camera and lens assembly of which may be mounted in an open-ended housing such as the air vent structures with which certain vehicles are provided with the center line of the lens brought into positions of use as the cover is raised.

Such a housing opens into a chamber in a vehicle. A first support has a transparent portion to which the cover is attached and which extends freely through the housing and into the chamber. A second support which is a free fit within the first support also extends into the chamber. A camera and lens assembly, within the housing, is supported by the second support. Drive means, connected to the first and second supports is operable to raise the first support from a position in which the outer end of the housing is closed by the cover into and out of positions in which its transparent portion is exposed. The camera and lens assembly is elevated or retractd by the drive means to bring the center line of the lens in position above the outer housing end but always below the cover whenever the cover is raised.

Another aspect of the invention is the drive means. While separate synchronous reversible motors or steppers motors are suitable for raising and lowering the two supports in the desired manner, the disclosed embodiment of the invention utilizes a single reversible motor to raise and lower both support simultaneously. To effect this result the motor rotates a depending drive member having upper and lower threaded portions with the upper portion threaded through a follower on the outer wall of the first support and the lower portion threaded through a follower to which the second support is connected in a manner enabling each support to move relative to the other. The thread formations of the two portions so differ that the second support and accordingly the camera and lens assembly travels at one half the rate at which the cover is raised or lowered.

Other objectives of the invention and the manner of their attainment will be apparent from the following description of a preferred embodiment and the appended claims.

BRIEF DESCRIPTION OF THE DRAWINGS

The accompanying drawings illustrate a preferred embodiment of the invention

THE PREFERRED EMBODIMENT

Figure 1:
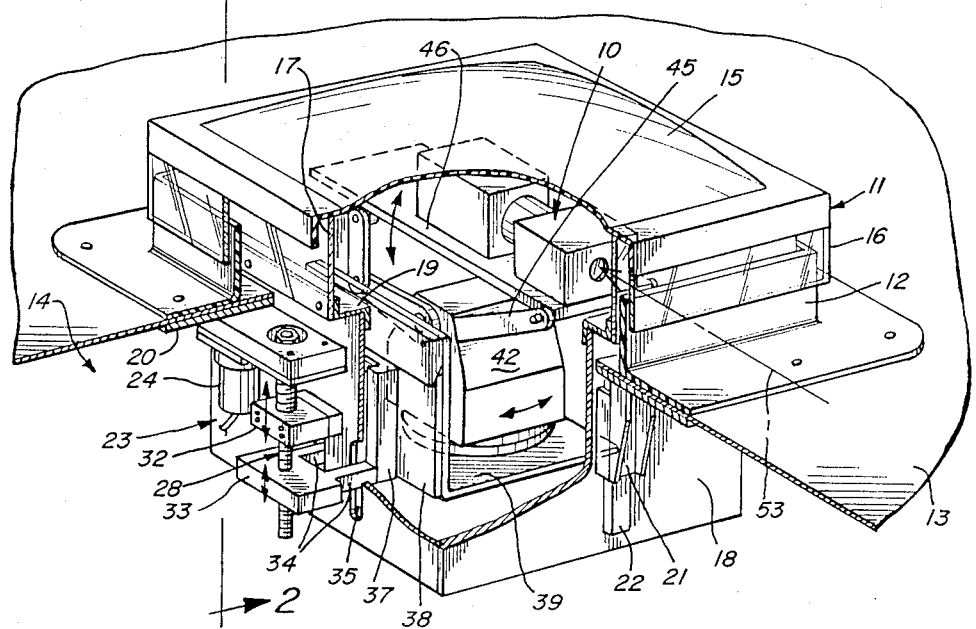
FIG. 1 is a perspective and partly sectioned of surveillance apparatus in accordance with the invention with the air vent cover open.
Figure 2:
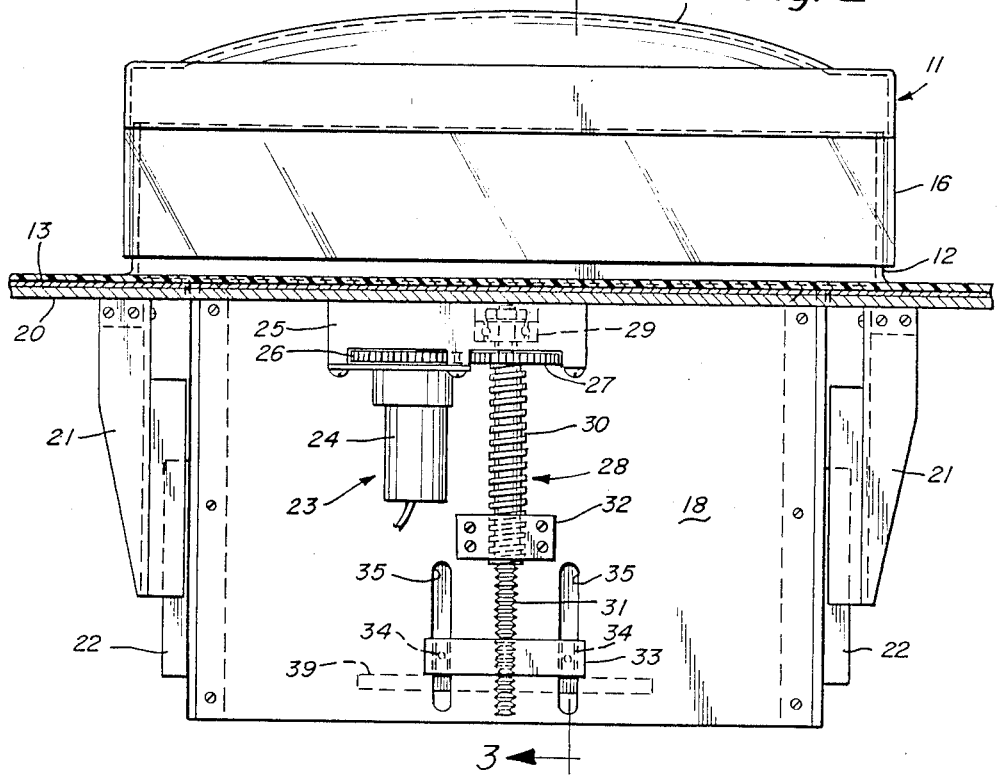
FIG. 2 is a section on an increase in scale and taken approximately along the indicated line 2—2 of FIG. 1 with the air vent closed.

The surveillance apparatus illustrated by the drawings is shown as having a camera and lens assembly, generally indicated at 10 within an air vent structure, generally indicated at 11 and of the type with which certain vans and recreational vehicles are equipped. Such air vent structures are typically five inches or less in height and consist of a rectangular, open ended housing 12 having one end opening through the roof 13 of a vehicle and into the interior 14 thereof and a cover 15 positionable to close the other upper end of the housing with a skirt 16 which, in accordance with the invention is transparent and dimensioned to so overlap the upper end of the housing that when the cover is in its closed position or in a partly or in its fully opened position, the skirt 16 is a water shield.

In accordance with the invention, the cover 15 is fixed on the upper edges of a square frame 17 the walls of which are transparent, in practise, glass or acrylic. The frame 17 is a close but free fit within the housing 12 and is connected to the upper edges of a cylindrical supporting sleeve 18 by a flange 19 which is Z-shaped in cross section. The supporting sleeve 18 extends freely through the housing 12 into the interior 14 of the vehicle.

A mounting plate 20 surrounds the opening through the roof 13 and is secured against the inner surface thereof. The plate 20 is provided with depending holders 21 each of which has a ball slide connection, generally indicated at 22. The connections 22 are such as the model V-220 made by Design Components Incorporated of Franklin, Massachusetts. The sleeve 18 is supported by the drive which is generally indicated at 23.

The drive 23, in the disclosed embodiment of the invention, has a low speed, reversible, D.C. 12 volt motor 24 secured in a depending position by a mount 25 attached to the undersurface of the roof 13. In the disclosed embodiment, the motor 24 is a model DR, manufactured by Merkle-Korff Industries of De Plaines, Illinois. The drive gear 26 of the motor 24 meshes with a gear 27 on a depending drive member 28 supported by a bearing assembly 29 within the mount 25. The drive member 28 has an upper threaded section 30 and a lower threaded section 31 of reduced diameter. The lower end of the upper section 30 is threaded through a holder 32 attached to the outer surface of the sleeve 18 midway between the ball slides 22.

Figure 3:
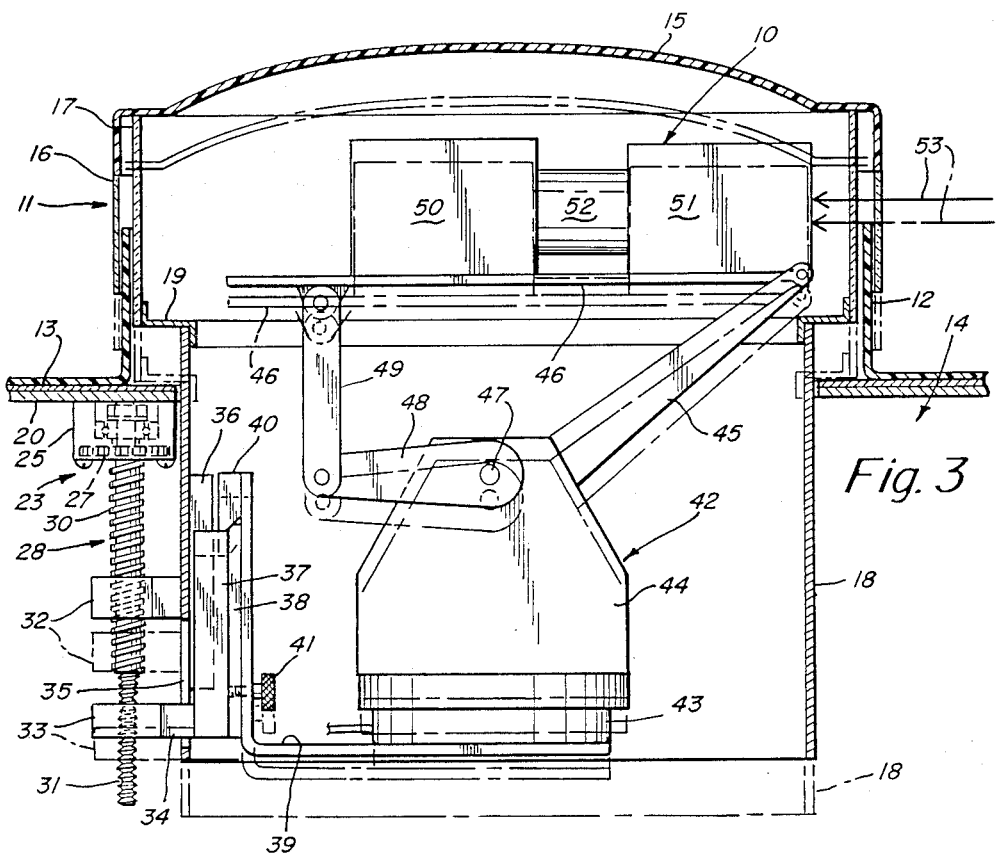
FIG. 3 is a section taken approximately along the indicated line 3—3 of FIG. 2.

The lower section 31 of the drive member 28 is threaded through follower 33 having arms 34 extending through parallel vertical slots 35 in the sleeve 18 on opposite sides of a vertical slideway 36 on the interior thereof and attached to a slide 37 to which a substantially wider plate 38 is connected. A bracket 39 has a hook 40 along the upper edge of its vertical wall caught over the upper edge of the plate 38 to support the bracket 39. Thumbscrews 41 of which one is shown in FIG. 3, releasably lock the lower end of the bracket 39 to the plate 38.

The surveillance unit which includes the horizontal bracket 39 supports a pan and tilt unit, generally indicated at 42 and is commercially availabale type such as model #V3400APT manufactured by Vicon Industries, Inc. of Melville, New York. The reversible pan motor 43 supports and rotates a mount 44 housing the reversible tilt motor (not shown) and in accordance with the present invention, is provided with arms 45 hingedly supporting one end of a platform and the tilt motor drives a shaft 47, provided with arms 48 fixed on the ends thereof which are pivotally connected to links 49 pivotally connected to the platform 46 adjacent its other end. The pan and tilt unit 42 has a remote control, not shown, such as model V113APF also manufactured by Vicon Industries, Inc.

Figure 4:
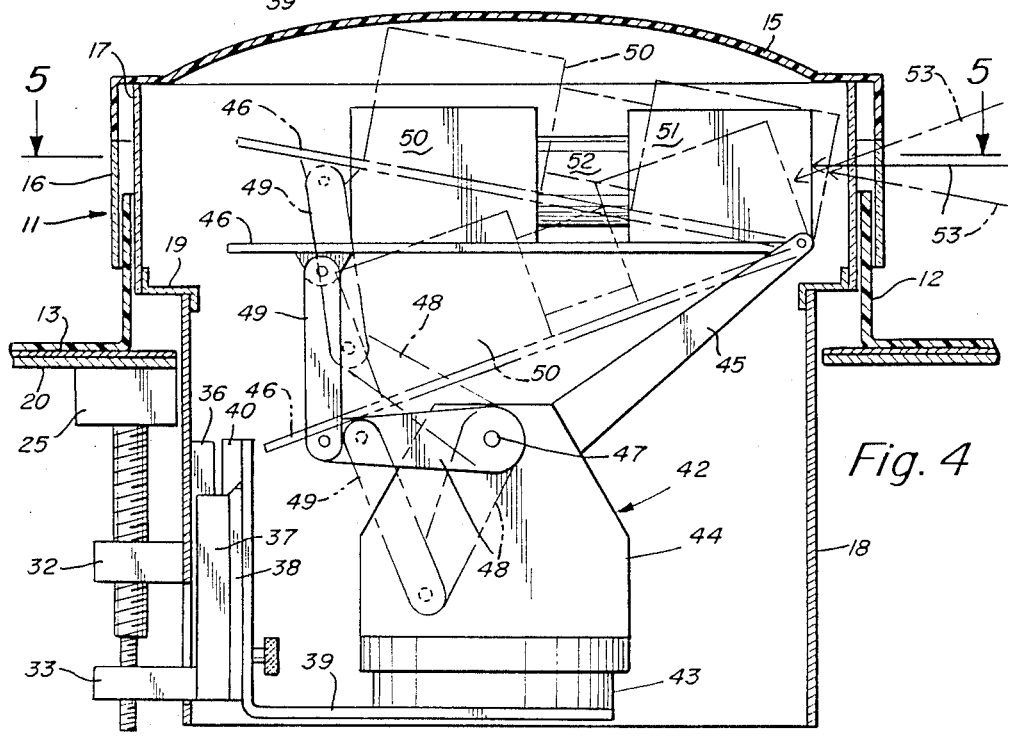
FIG. 4 is a like view illustrating different tilted positions of the camera and lens assembly.
Figure 5:
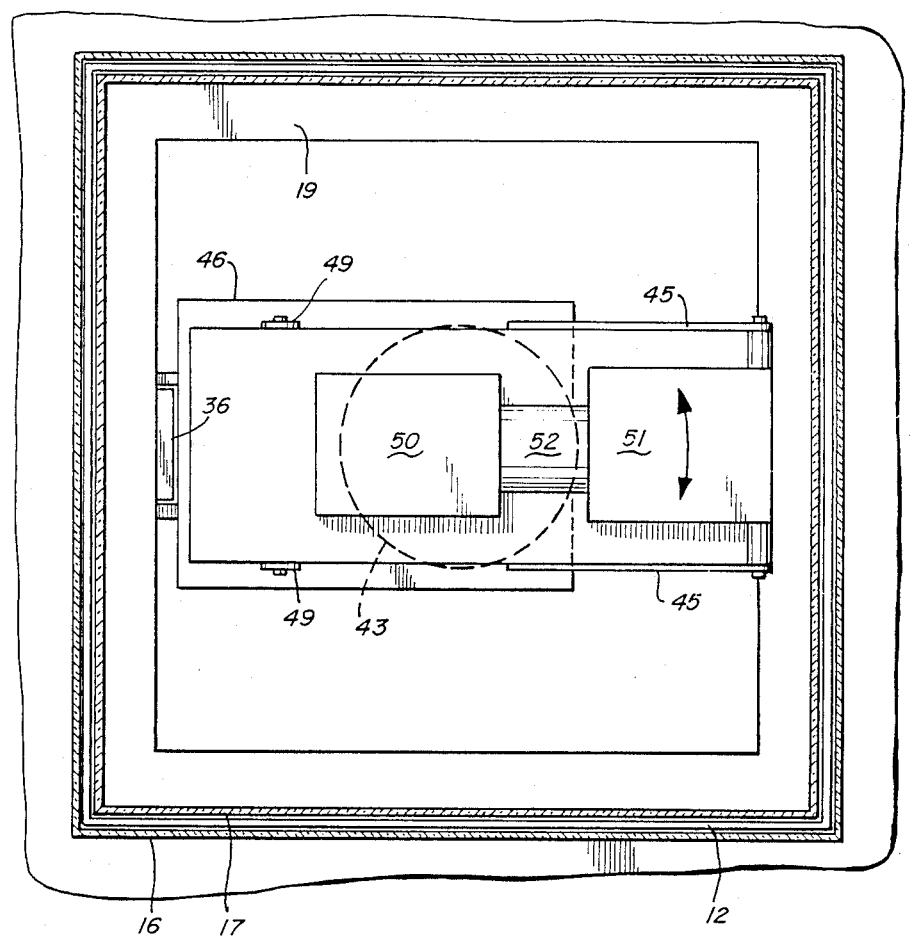
FIG. 5 is a section taken approximately along the indicated line 5—5 of FIG. 2.

The camera and lens assembly 10 of the surveillance unit is mounted on the platform 46 and the assembly is shown as comprising a camera 50, a motorized zoom lens 51 and an intensifier 52. The center line of the lens is generally indicated 53 in FIGS. 1 and 4. In the disclosed embodiment the camera 50 is a digital camera model VC286-24 also made by Vicon Industries, Inc. having a remotely operated control, not shown. The zoom lens 51 is or may be model V10 100MS, also a product of Vicon Industries, Inc. and having a controller V 100 C not shown.

The thread formations of the sections 30 and 31 of the drive member and of the followers 32 and 33, respectively, so differ that whenever the drive member is rotated in either direction the follower 33 travels a distance which is one half the distance the follower 32 travels so that even with the platform 46 tilted into either extreme angular relationship, a substantially full image is viewed.

The disclosed embodiment of the invention is manually operated and the drive 23 by which the surveillance unit is raised and lowered effects such travel at a slow rate, in practise, approximately one eighth of an inch per second. The pan motor provides 360° rotation in approximately one minute and the tilt motor effects platform tilting approximately 1° per second When any componenet of the surveillance apparatus needs to be serviced, with the cover in its closed position, the horizontal wall of the bracket is positioned at the bottom open end of the sleeve 18. The screws 41 are then readily accessible and when backed off to release the lower portion of the vertical bracket wall, the bracket can be lifted to disengage the hook from the plate 38. The bracket with the pan and tilt unit and the camera and lens assembly may then be removed.

The circuits for the zoom lens, the camera controls and the motor of the pan and tilt unit are not detailed. They may be operated manually either from a station adjacent the apparatus or from a remote position any of the components may be computer controlled.

I claim:

1. Surveillance apparatus including an open ended housing member connected to a wall member of a chamber with one end opening into the interior thereof and the other end spaced outwardly of the wall member, a cover having a cap and depending side walls so shaped and dimensioned that the side walls and said other end may fit together in an overlapping relationship, the cover also including first supporting means extending into the housing member, second supporting means fitting freely within the housing member, a surveillance unit rotatably supported by the second supporting means, said unit including a camera and lens assembly and means operable to tilt the unit and the center line of the lens upwardly or downwardly relative to a first position normal to the axis of rotation of the unit, and reversible drive means held by one of said members and connected to the supporting means, said drive means operable to raise the two supporting means from and return them to a first relationship in which the walls of the cover and said other housing end overlap and the unit is spaced a predetermined distance from the cap with the lens center line above the lower ends of the side walls of the cover but shielded by said other end of the housing member and the side walls of the cover against outside light, said drive means operable simultaneously to raise the cover at a first rate to admit outside light into said other end of the housing member and to raise the second supporting means at a second, slower rate to keep the lens center line in a position between said other end of the housing member and the side walls of the cover in which the lens center line is exposed directly to outside light with the distance between the unit and the cap increased.

2. The surveillance apparatus of claim 1 in which the rate at which the unit travels is one half the rate of travel of the cover.

3. The surveillance apparatus of claim 2 in which in the first relationship between the cover and the unit, the center line of the lens is in a plan which substantially coincides with a plane inclusive of the opening of said other end of the housing.

4. The surveillance apparatus of claim 1 in which that portion of the first supporting means which is exposed to the outside light when the cover is raised also then exposes the lens center line is a transparent wall surrounding the unit.

5. The surveillance apparatus of claim 1 in which sidewalls of the cover include upper opaque portion and lower transparent portions, the admission of outside light to the first supporting means through the lower portions is blocked by the housing in the first relationship between the cover and the unit.

6. The surveillance unit of claim 1 in which the reversible drive means includes separate connection with each support.

7. The surveillance apparatus of claim 1 in which the reversible drive means includes a rotatable drive member in the chamber with the drive member positioned close to and parallel to the first supporting means, the drive member has upper and lower threaded portions, the first supporting means has a threaded connection with the upper threaded portion, the second supporting means has a threaded connection with the lower threaded portion, and the thread formations of the two threaded portions so differing that the turning of the drive member in either direction effects travel of the second supporting means at a slower rate than that of the first supportiong means.

8. The surveillance apparatus of claim 7 in which the rate of travel of the second support is one half that of the first support.

9. The surveillance unit of claim 7 in which the drive means includes a reversible electric motor.

10. The surveillance apparatus of claim 7 in which the portion of the first supporting means is a sleeve extending into the chamber, the threaded connection of the first supporting means with the drive member is mounted on the outer surface of the sleeve, the second supporting means is L-shaped, means slidably connecting one arm thereof to the inner wall of the sleeve for movement toward or away from the cap and means connecting the unit to the other arm.

11. The surveillance apparatus of claim 10 in which the means connecting said one arm to the interior of the sleeve comprises a vertical slideway on the interior thereof, said one arm has a slide in engagement with the sliddeway, means detachably connecting the second supporting means to the slide, the sleeve has parallel slots on opposite sides of the slideway, the means connecting supporting means to the drive member comprises a threaded follower on the lower portion of the drive member provided with parallel arms each of which extends through the appropriate one of the slots and is connected to the slide.

12. The surveillance unit of claim 11 in which the free end of said one wall is provided with a hook releaseably caught by the upper end of the slide and a threaded member releaseably secures said one wall to the lower end of the slide.

13. The surveillance apparatus of claim 1 in which the camera and lens assembly consists of a camera, a motorized zoom lens and an intensifier between the camera and lens.

14. The surveillance apparatus of claim 13 in which the second support also includes a pan and tilt unit on which the camera and lens assembly is mounted.

* * * * *